Oct. 1, 1940.                     J. B. PARSONS                     2,216,518
                              HYDRAULIC CONTROL SYSTEM
                              Filed June 1, 1938           2 Sheets-Sheet 1
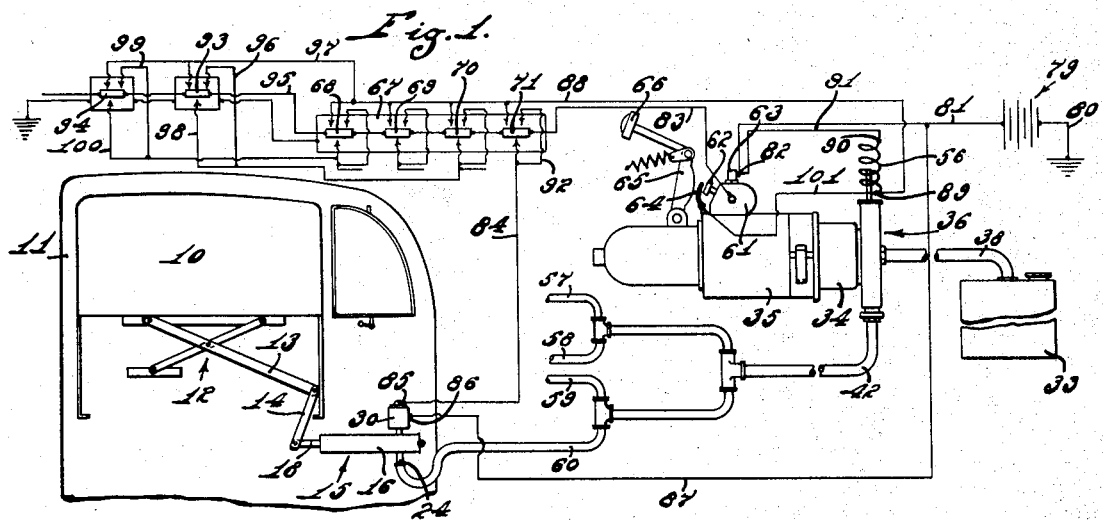
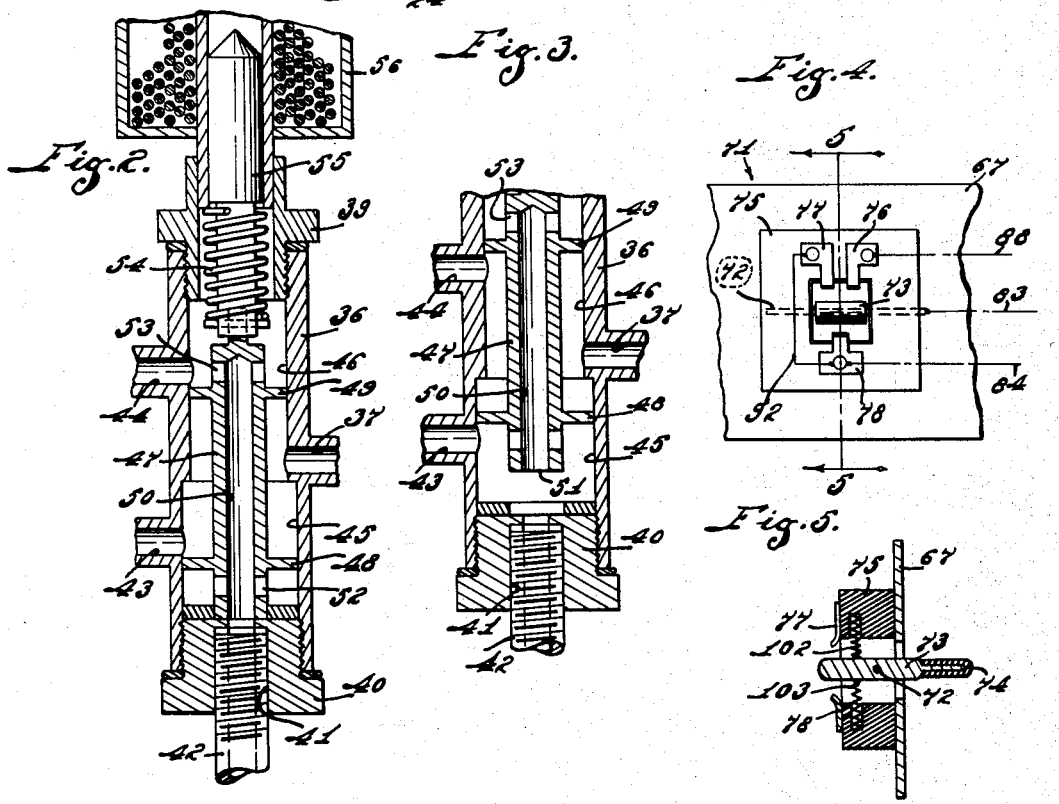
INVENTOR.
John B. Parsons,
BY
Hood + Hahn.
ATTORNEYS.

Oct. 1, 1940.  J. B. PARSONS  2,216,518
HYDRAULIC CONTROL SYSTEM
Filed June 1, 1938   2 Sheets-Sheet 2
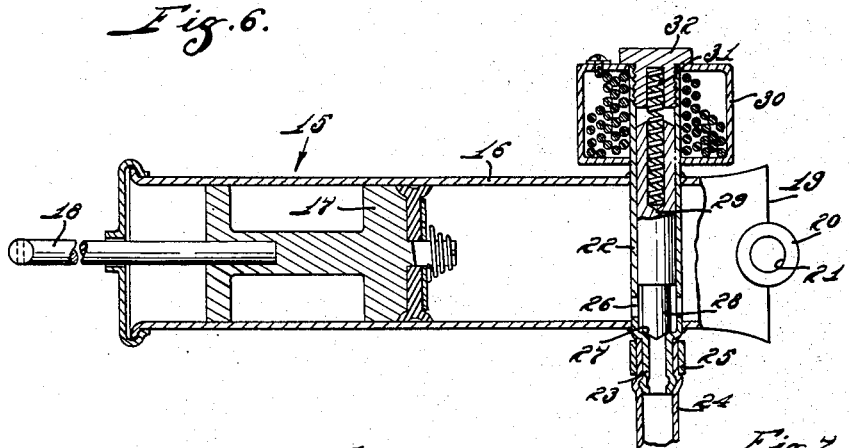
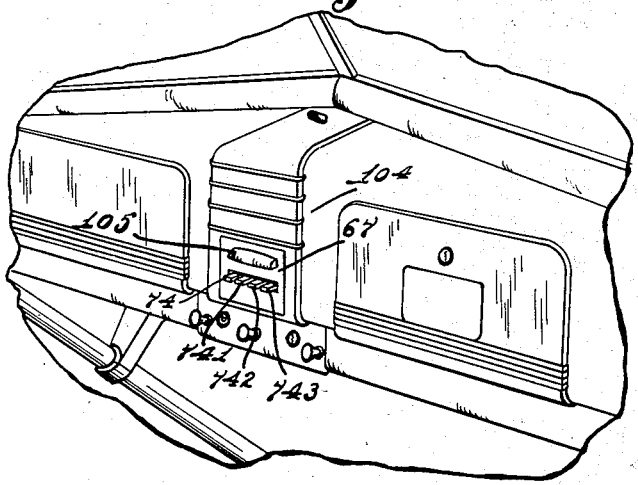
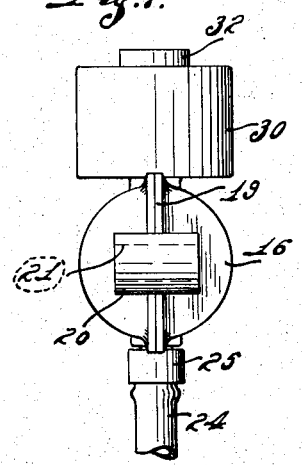
INVENTOR.
John B. Parsons,
BY
Hood & Hahn.
ATTORNEYS.

Patented Oct. 1, 1940

2,216,518

UNITED STATES PATENT OFFICE 2,216,518

HYDRAULIC CONTROL SYSTEM

John B. Parsons, Indianapolis, Ind.

Application June 1, 1938, Serial No. 211,199

14 Claims. (Cl. 180—1)

It is not only inconvenient, but actually dangerous, for the driver of an automobile to be forced to operate any of the windows of the automobile except that which is most closely adjacent to him. There are, however, many occasions on which it becomes necessary or at least highly desirable, for the driver to open or close one of the windows in the rear compartment of the vehicle.

It is the primary object of the present invention to provide control means, located on the instrument board or at some other convenient position, whereby the windows of an automobile may be automatically operated. A further object is to provide fluid-actuated means, controllable from a point convenient to the operator of an automotive vehicle, for controlling the windows of the vehicle. It is a further object of the invention to provide a hydraulic system of the character above suggested in which the automobile starter motor is used to supply the necessary power. A still further object of the invention is to provide hydraulic means for locking the windows of an automobile in any desired position.

It will be obvious that the present invention is applicable primarily to the control of windows in automotive vehicles; but that it may also be used to shift any desired element, whether in an automotive vehicle or in some other environment.

Further objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

Fig. 1 is a diagrammatic view of one embodiment of the present invention, only one of the plurality of windows to be operated being illustrated;

Fig. 2 is an enlarged sectional view of the flow-controlling valve which forms an element of the organization illustrated in Fig. 1;

Fig. 3 is a fragmental section similar to Fig. 2, the valve being shown in another position of adjustment;

Fig. 4 is an enlarged elevation of a switch assembly which may be used in the organization of the present application;

Fig. 5 is a sectional view taken substantially on the line 5—5 of Fig. 4 and looking in the direction of the arrows;

Fig. 6 is an enlarged longitudinal section through a fluid motor used in the installation of the present invention;

Fig. 7 is an end elevation of the same but looking from the right of Fig. 6; and Fig. 8 is a fragmental perspective view of an instrument board of an automobile, showing the control panel of the installation illustrated in Fig. 1.

In Fig. 1, I have shown a window 10 in the left front door 11 of a standard automobile, said window 10 being provided with operating means, indicated generally by the reference numeral 12, and including a lever 13 which is connected, by a link 14, for operation by a fluid motor, indicated generally by the reference numeral 15, and illustrated in detail in Fig. 6.

Said motor comprises a cylinder 16 in which is reciprocably mounted a piston 17 provided with a stem or rod 18 projecting through one end of the cylinder and directly connected to the link 14. The opposite end of the cylinder may preferably be closed by pinching the walls of the tube, as indicated at 19 in Figs. 6 and 7, and welding the parts in the illustrated positions. Preferably, a notch is cut in the closed end of the cylinder so formed, to accommodate a short piece of tubing 20 formed with a bore 21, said tubing being welded in place during the closing operation. This arrangement provides a journal mounting for the motor, a bolt or screw being passed through the bore 21 of the element 20 and being suitably secured in place on the automobile door.

In transversely aligned apertures formed in the tube 16 upon an axis perpendicular to the axis of the element 20, there is mounted a tube 22 which, at its lower end, is reduced as at 23 for the reception of a piece of flexible tubing 24 which is held in place by a clamp ring 25 of desired characteristics. Within the cylinder 16, said tube is formed with one or more ports 26; and the shoulder formed by the reduction 23 is preferably formed as a valve seat 27, with which cooperates a reciprocating valve 28. A stem 29 of this valve constitutes the core of a solenoid 30; and the valve is urged toward the closed position by a spring 31 received between the stem 29 and plug 32 threaded into the bore of the solenoid. Obviously, upon energization of the solenoid 30, the valve 28 will be lifted off its seat 27 to establish communication between the tube 24 and the interior of the cylinder 16.

A reservoir is conventionally illustrated at 33 in Fig. 1. The principles of the present invention may obviously be applied to a pneumatic system; but I have illustrated a hydraulic system which, in my present opinion, is preferable. Obviously, in a pneumatic system, no reservoir will be necessary; and even in a hydraulic system it is not essential that a separate reservoir be provided; since brake fluid may be drawn from the conventional brake-system reservoir for use in the present system, or oil may be drawn from the crank case for a like use.

A pump 34 of desired characteristics forms an essential element of the present invention. Obviously, any type of fluid pump may be used, and any means may be provided for driving it; but I prefer to use a rotary pump; and I believe that, in the interest of economy, it will be highly desirable to use the motor uniformly provided for starting the internal combustion engine of the automotive vehicle, to supply the power for driving the pump. In Fig. 1, therefore, I have illustrated the pump 34 quite conventionally; and I have shown it directly associated with the standard starter motor 35. A valve, indicated generally at 36, is directly associated with the pump and comprises means for controlling the fluid flow during pump operation. This valve is illustrated in detail in Figs. 2 and 3.

A casing 36 is formed with a port 37 with which is connected a pipe 38 providing communication with the reservoir 33. One end of the casing 36 is closed by a plug 39, and the opposite end thereof is closed by a plug 40 which is formed with a longitudinal bore 41 which comprises an axial port for the casing 36, and in which is received a conduit 42.

The casing 36 is further formed with a port 43 which communicates with the intake of the pump 34; and with a port 44 which communicates with the outlet of said pump. It will be seen that the ports 43 and 44 are axially spaced radial ports and that the port 37 is a radial port which is angularly spaced from the ports 43 and 44 but is positioned axially between said ports 43 and 44.

The casing is formed to provide a chamber which, in the illustrated embodiment of the invention, consists of two parts 45 and 46, the former being somewhat larger in diameter than the latter, for a reason later to be explained. Reciprocably mounted within the chamber is a valve member 47 which is formed to provide a piston head 48 within the chamber portion 45 and a piston head 49 within the chamber portion 46. The valve member 47 is further formed with a longitudinally extending bore 50 which is open as at 51 at the end adjacent the plug 40 and which is formed with one or more ports 52 between the piston head 48 and the plug 40 and with one or more ports 53 between the piston head 49 and the plug 39. A spring 54 urges the valve 47 toward the position illustrated in Fig. 2, and the core 55 of a solenoid 56 is secured to the valve member 47 so that said valve member partakes of movement of the core 55.

The conduit 42 is suitably branched into any desired number of branches, herein illustrated as the four pipes 57, 58, 59, and 60. As illustrated, the pipe 60 leads to the fluid motor associated with the window in the left-hand front door, and the pipes 57, 58, and 59 will obviously lead to fluid motors associated with three other windows of the vehicle (not shown)

Associated with the starter motor 35 I have illustrated a mechanical-electrical switch 61 dominating the motor 35. The switch may be closed manually by depression of the plunger 62, or it may be closed electrically by energization of the solenoid indicated by the reference numeral 63. In the illustrated structure, an electrically insulated arm 64 is positioned between the plunger 62 and the lever 65 which is adapted to be actuated by the starter pedal 66. Depression of the pedal 66 first throws a pinion on the motor shaft mechanically into mesh with a gear on the flywheel of the automobile engine (not shown) and then causes the lever 65 to engage the arm 64 to move the same to depress the plunger 62 to energize the motor 35. Obviously, if the motor 35 is to be used to supply power to move the windows of the vehicle, it must be energized through some means other than the starter pedal 66, so that the driving connection between the starter motor and the vehicle engine will not be established at times when it is desired to shift the windows.

In accordance with standard automotive practice, I use a single wire system to control the organization of the present invention, all circuits leading from the battery to ground. The switches which are mounted for convenient manipulation by the operator of the vehicle are mounted upon a panel 67 which is grounded, as is illustrated; and the panel carries four switches, in the illustrated embodiment, the switch 68 being adapted to control the right rear window, the switch 69 controlling the right front window, the switch 70 controlling the left rear window, and the switch 71 controlling the illustrated left front window. Since the four switches are identical, and are identically mounted in the panel 67, only the switch 71 is illustrated in detail in Figs. 4 and 5. A rocker shaft 72, journalled in a block 75 of insulating material mounted upon the rear of the panel 67, supports a metallic arm 73 which terminates in a finger piece 74 of insulating material. Two contact fingers 76 and 77 are mounted for engagement by the inner end of the arm 73 upon downward movement of the finger piece 74, and one contact finger 78 is mounted for engagement by the inner end of the arm 73 upon upward movement of the finger piece 74. The parts are so proportioned that, when the inner end of the arm 73 engages either the contact elements 76 and 77 or the contact element 78, the outer end of the arm will simultaneously engage the metallic panel 67, whereby the engaged contact finger is electrically connected to ground. The switch arm 73 is normally held in its illustrated neutral position by opposed coiled springs 102 and 103.

The storage battery normally carried by an automotive vehicle is indicated by the reference numeral 79, and one side of the battery is shown as connected to ground by a wire 80. From the other side of the battery a wire 81 leads to one terminal 82 of the solenoid 63 associated with the switch 61. A wire 83 leads from the opposite terminal of said solenoid to the rock shafts 72 of the four switches 68, 69, 70, and 71. Obviously, then, movement of the switch arm 73 into engagement with the panel 67 will close a circuit through the solenoid 63 to close the switch dominating the energizing circuit for the motor 35, thereby starting said motor to drive the pump 34.

A wire 84 leads from the contact finger 78 to one terminal 85 of the solenoid 30; and the opposite terminal 86 of said solenoid is connected to the hot wire 81 by a wire 87. It will be clear, therefore, that upward movement of the finger piece 74 will establish not only the circuit which closes the switch 61, but also a circuit through wires 81 and 87, solenoid 30, wire 84, contact finger 78, arm 73, and panel 67 to ground, to energize the solenoid 30 to lift the valve 28 controlling flow to the motor 15. The parts of the valve 36 being in the positions illustrated in Fig. 2, operation of the pump will draw liquid from the reservoir 33 through port 37 and port 43 to the pump, and thence through port 44, ports 53, passage 50, and port 51, to conduit 42. The valve 28 having been lifted by energization of the solenoid 30, the liquid will flow through the branch 60 and flexible tube 24 into the cylinder 16 to move the piston 17 toward the left to raise the window 10.

As long as the arm 73 is held in the above-mentioned position, the pump will continue to operate to force liquid through the above-described path, and the window 10 will continue to move upwardly either until the arm 73 is released or until the window strikes an obstruction which may be the upper end of its frame. If the window does strike an obstruction, it will be obvious that pressure will build up in the chamber portion 46 above the piston head 49 and in the chamber portion 45 below the piston head 48. Since the effective diameter of the piston head 48 is greater than the effective diameter of the piston head 49, such a rise in pressure will overcome the tendency of the spring 54 and will move the valve 47 upwardly until the port 44 is partially uncovered by the head 49. In this position of the valve, liquid thrown by the pump may pass directly from the port 44 to the port 43, thus establishing a by-pass circuit, so that no damage will be done to the window or to the operating mechanism.

A wire 88 connects the contact fingers 76 of all of the switches 68, 69, 70, and 71 with one terminal 89 of the solenoid coil 56, the opposite terminal 90 thereof being connected to the wire 81 at the terminal 82. A wire 92 connects the contact finger 77 with the contact 78.

Therefore, if the finger piece 74 is depressed, the following circuits will be established. An energizing circuit for the solenoid 63 may be traced from the battery 79 through wire 81, solenoid 63, wire 83, rock shaft 72, arm 73, and panel 67 to ground.

At the same time, an energizing circuit for the solenoid 56 is established from the battery 79 through wire 81, wire 91, solenoid 56, wire 88, contact finger 76, arm 73, and panel 67 to ground.

At the same time, an energizing circuit for the solenoid 30 is established from the battery 79 through wire 81, wire 87, solenoid 30, wire 84, wire 92, contact finger 77, arm 73, and panel 67 to ground. Thus, the motor 35 is caused to drive the pump 34. Energization of the solenoid 56 having shifted the valve 47 to the position of Fig. 3, operation of the pump 34 will tend to draw liquid from the pipe 42. The valve 28 having been opened by energization of the solenoid 30, liquid will be drawn from the cylinder 16, through branch 60 and pipe 42 and port 43 to the intake of the pump 34, and will be discharged through ports 44 and 37 and pipe 38 to the reservoir 33. Movement of the piston 17 toward the right will follow, and will cause counter-clockwise movement of the lever 13 to lower the window 10. If the arm 73 is not released before the window strikes an obstruction in its downward movement, a vacuum will be drawn in the chamber portion 45 below the piston head 48 and in the chamber section 46 above the piston head 49 which, because of the difference in the effective areas of the piston heads, will cause the valve 47 to move downwardly into the median position above described in which a short circuit for the liquid propelled by the pump is established.

In the wiring diagram of Fig. 1 there are illustrated two switches 93 and 94. A wire 95 connects the rock shafts of the switches 93 and 94 with the wire 83; and wire 97 connects the contact fingers 76 of the switches 93 and 94 with the wire 88. A wire 96 connects the contact finger 77 of the switch 93 with contact finger 78 of switch 70 and the wire 98 connects the contact finger 78 of the switch 93 with the contact finger 78 of switch 70. Similarly, a wire 99 connects the contact finger 77 of switch 94 to the contact finger 78 of switch 68, and the wire 100 connects the contact finger 78 of switch 94 with the contact finger 78 of switch 68. The switch 93 is positioned on the left rear door, or adjacent thereto, and the switch 94 is positioned on or adjacent the right rear door, so that the occupants of the rear compartment of the vehicle may operate their own windows, if desired, without disturbing the driver of the vehicle.

The fact that I have chosen to use the standard starter motor to provide power for the present system and that, in order to simplify the system as much as possible, I have connected the pump permanently to the starter motor, means that the pump will be operated even when the starter motor is used to perform its normal function. The above-described safety feature of the valve 36 will, of course, prevent damage to the system as a result of such operation; but I am of the opinion that the power demanded by the pump when the valve 47 is in the position of Fig. 3 is somewhat less than the power demanded when the valve 47 is in the position of Fig. 2. Preferably, therefore, means will be provided for automatically shifting the valve 47 to the position of Fig. 3 whenever the starter pedal 66 is operated.

In the illustrated embodiment of the invention, a wire 101 provides an electrical connection between the terminal 89 of the solenoid 56 and the electrically insulated arm 64. The lever 65, on the other hand, is grounded upon the motor frame. Therefore, when the starter pedal 66 is depressed and the lever 65 engages the arm 64, an energizing circuit for the solenoid 56 is established from the battery 79 through wire 81, wire 91, solenoid 56, wire 101, arm 64, and lever 65 to ground; whereby the valve 47 is moved to the position of Fig. 3.

The fact that the valve casing 36 is constantly filled with oil causes a dash-pot action which delays somewhat the movement of the valve 47 in either direction. This I consider to be desirable because it allows an instant delay after initiation of pump operation to facilitate movement of the valves 28; and further because the dash-pot effect prevents accidental reverse movement of the window at the end of downward movement thereof, which would occur if the valve 47 were allowed to move to the position of Fig. 2 before operation of the pump had completely stopped.

In Fig. 8 I have illustrated a suggested arrangement of the panel 67 and its associated control elements. The said panel is set into the instrument board 104 with the finger pieces 74, 741, 742, and 743 projecting for convenient manipulation by the vehicle operator. It will be clear that the finger piece 74 will operate the switch 71, the finger 741 will operate the switch 70, the finger piece 742 will operate the switch 69, and the finger piece 743 will operate the switch 68. If desired, a hooded light 105 may be positioned to illuminate the four finger pieces.

It will be obvious that, with this arrangement, the operator can readily manipulate the windows individually by shifting any desired one of the projecting finger pieces; or he may operate all four windows simultaneously by shifting all four finger pieces with a single finger.

An important feature of the present invention lies in the provision of the valve 28 associated with each of the fluid motors. Since these valves are spring pressed to closed position, it will be clear that as long as the manual switches are not disturbed, the windows will be locked. That is, since liquid is trapped in the fluid motor cylinders, the pistons 17 cannot be moved against the liquid; and, since the said pistons are operatively connected to the windows, the windows will be locked in any desired position of adjustment against movement toward open position.

Obviously, the device of the present application may be applied to any desired number of the windows of a vehicle, or it may be applied to shift any other shiftable unit of the vehicle. As obviously, although I prefer to utilize the power available in the starting motor to shift the windows, I may use any other suitable source of power, such as an additional motor, or power may be drawn from some rotating part of the vehicle engine. Thus, either the starter motor or some part of the vehicle engine or an additional motor may be used to supply power to a fluid pump to drive fluid motors to shift desired elements, or any one of those power sources may be used to drive the shiftable elements directly through mechanical driving connections. Alternatively, but less desirably, individual electric motors, independently controllable from a switchboard such as that illustrated herein, might be provided for driving each of the shiftable elements.

In certain of the claims appended hereto, reference is made to a vehicle having a plurality of windows, and means associated with each of said windows for shifting the same. It will be obvious that this language means that a shifting means is associated with each of the "plurality of windows" referred to; and not necessarily with every window of the vehicle.

I claim as my invention:

1. The combination with a movable closure of an electric motor, a pump connected to be driven thereby, a relay-controlled switch dominating said motor, a fluid motor connected to operate said closure, a conduit leading from said pump to said fluid motor, a normally closed valve in said conduit adapted when closed to trap fluid in said fluid motor thereby to retain the closure in the position of adjustment, electrically actuated means operable, upon energization, to open said valve, energizing circuits for said relay-controlled switch and for said electrically actuated means, and switch means operable to close said energizing circuits.

2. The combination with a movable closure of an electric motor, a pump connected to be driven thereby, a relay-controlled switch dominating said motor, a fluid motor connected to operate said closure, a conduit leading from said pump to said fluid motor, valve means shiftable to reverse the direction of pumped fluid flow in said conduit, a normally closed valve in said conduit adapted when closed to trap fluid in said fluid motor thereby to retain the closure in the position of adjustment, electrically actuated means operable, upon energization, to open said valve, energizing circuits for said relay-controlled switch and for said electrically actuated means, and switch means operable to close said energizing circuits.

3. The combination with a movable closure of an electric motor, a pump connected to be driven thereby, a relay-controlled switch dominating said motor, a fluid motor connected to operate said closure, a conduit leading from said pump to said fluid motor, valve means shiftable to reverse the direction of pumped fluid flow in said conduit, said valve means being biased toward one position of adjustment, electric means operable, upon energization, to shift said valve means against its bias to an opposite position of adjustment, a normally closed valve in said conduit, electrically actuated means operable, upon energization, to open said valve, energizing circuits for said switch-operating relay, for said electrically actuated means, and for said electric means, and switch means selectively operable to close all of said energizing circuits, or to close only the energizing circuits for said relay and for said electrically-actuated means.

4. In combination, a motor, a fluid pump operatively connected to be driven by said motor, a plurality of fluid motors, means providing fluid communication between said pump and said fluid motors, a valve disposed between said pump and said motors and shiftable to determine the direction of fluid flow between said pump and said motors, electric means for shifting said valve, and switch means movable in one direction from a neutral position to effect operation of said first-named motor and to energize said electric means, and movable in another direction from a neutral position to effect operation of said first-named motor without energizing said electric means.

5. The combination with a movable element of a fluid motor operatively connected to move said element, a fluid pump having fluid communication with said motor, means for driving said pump, and means for controlling the direction of fluid flow between said pump and motor, comprising a cylinder provided with a first radial port communicating with the intake of said pump, a second radial port communicating with the outlet of said pump, a third radial port angularly spaced from said first and second ports and located axially between the same, and an axial port, a valve reciprocable in said cylinder and provided with a piston head shiftable from a position between said first port and said axial port to a position between said first port and said third port, and with another piston head of less effective area shiftable from a position between said second port and said third port to a position spaced from said third port by said second port, said valve further being formed with an axial bore opening into said cylinder at points between said heads and the adjacent ends of said cylinder.

6. In an automotive vehicle having an engine and a movable closure, an unidirectional electric motor for driving said engine, mechanism providing an operative connection between said motor and the movable closure, said mechanism comprising a hydraulic pump operatively connected to said motor, a fluid motor operatively connected to said closure, means providing communication between said pump and fluid motor, a valve associated with said pump for controlling the direction of liquid flow to said fluid motor, electric means controlling said valve, a normally closed valve associated with said fluid motor, electric means for actuating said normally closed valve, energizing circuits for said motor, for said pump valve and for said fluid motor valve, and switch means for selectively closing all of said circuits, or to close only the circuits for said motor and said fluid motor valve.

7. The combination with a movable closure of an electric motor, a pump connected to be driven thereby, a relay controlled switch dominating said motor, a fluid motor connected to operate said closure, a conduit leading from said pump to said fluid motor, valve means shiftable to reverse the direction of pumped fluid flow in said conduit, electrical means for actuating said valve, a second valve in said conduit in advance of said first valve, means closing said second valve when said pump is inactive, positive means for opening said second valve upon operation of said pump, energizing circuits for said relay-controlled switch and said electrical means, and switch means operable to close both of said energizing circuits.

8. In an automotive vehicle having a movable closure, an engine, a starter motor for the engine, mechanism for actuating said closure from said motor, said mechanism comprising a hydraulic pump operatively connected to said motor, means responsive to liquid under pressure for operating said closure, means providing a conduit between said pump and closure operating means, a flow control means associated with said pump for controlling the direction of liquid flow, means yieldingly holding said control means in one position, electric means for actuating said control means to an opposite position, a normally closed valve associated with said operating means, electro-responsive means for opening said valve, energizing circuits for said motor, for said electric means, and for said electro-responsive means, and switch means selectively operable to close all of said energizing circuits, or to close only the energizing circuits for said motor and for said electro-responsive means.

9. In an automotive vehicle having a movable closure, an engine, a starter motor for the engine, mechanism for actuating said closure from said motor, said mechanism comprising a hydraulic pump operatively connected to said motor, means responsive to liquid under pressure for operating said closure, means providing a conduit between said pump and closure operating means, a flow control valve for reversing the liquid flow through said conduit, spring means normally holding said valve in one position, electric means including a solenoid for actuating said valve to the opposite position, a normally closed valve associated with said operating means, electro-responsive means for opening said valve, energizing circuits for said motor, for said electric means, and for said electro-responsive means, and switch means selectively operable to close all of said energizing circuits, or to close only the energizing circuits for said motor and for said electro-responsive means.

10. In an automotive vehicle having a plurality of independently movable windows, a fluid motor operatively associated with each of said windows to move the same, an electrically controlled valve for each fluid motor, a pump having operative communication with all of said motors, an electrically controlled valve associated with said pump for controlling the fluid flow to and from said fluid motors respectively, a motor for driving said pump, energizing circuits for said motor and each of said valves, and independent switch means for each fluid motor valve for selectively energizing one of said fluid motor valves and concomitantly energizing said motor and said pump valve for moving the window in one direction.

11. In an automotive vehicle having a plurality of independently movable windows, a fluid motor operatively associated with each of said windows to move the same, an electrically controlled valve for each fluid motor, a pump having operative communication with all of said motors, a flow control valve associated with said pump for controlling the fluid flow to and from said fluid motors respectively, means for yieldingly holding said valve in one position of adjustment to cause fluid flow in one direction, electro-responsive means for actuating said valve to the other position of adjustment to cause fluid flow in the opposite direction, energizing circuits for said motor and each of said valves, and separate switch means for each fluid motor valve for selectively energizing one of said fluid motor valves and concomitantly energizing said motor and electro-responsive means, thereby to move the respective window in one direction, or for energizing one of the fluid motor valves and concomitantly energizing said motor only, thereby to move the respective window in the opposite direction.

12. In an automotive vehicle having a plurality of independently movable closures, a unidirectional electric motor, a pump connected to be driven thereby, a relay-controlled switch dominating said motor, a fluid motor operatively associated with each of said closures to move the same, conduits leading from said pump to said fluid motors, valve means shiftable to reverse the direction of pumped fluid flow in said conduits, said valve means being biased toward one position of adjustment, electric means operable upon energization to shift said valve means against its bias to an opposite position of adjustment, a normally closed valve for each of said fluid motors, electrically actuated means for each fluid motor valve operable upon energization to open said valve, energizing circuits for said switch operating relay, for each of said electrically actuated means, and for said electric means, and independent switch means for each electrically actuated means selectively operable to close said energizing circuits, or to close only the energizing circuits for said relay and for said electrically actuated means.

13. In an automotive vehicle, the combination with a member movable between two limits of adjustment, an electric motor, a pump connected to be driven thereby, a fluid motor connected to actuate said member, a conduit leading from said pump to said fluid motor, a normally closed valve in said conduit adapted when closed to trap fluid in said fluid motor thereby to retain the member in a position of adjustment between the two limits, electro-responsive means operable, upon energization, to open said valve, energizing circuits for said motor and electro-responsive means, and switch means operable to close said energizing circuits.

14. In an automotive vehicle having a plurality of independently movable windows, an electric motor, a pump connected to be driven thereby, a fluid motor operatively associated with each of said windows, conduit means connecting said pump and each fluid motor, a normally closed valve for each fluid motor arranged in said conduit means and adapted when closed to trap fluid in the respective fluid motor thereby to retain the closure in the position of adjustment, electro-responsive means for each valve adapted, upon energization, to open same, energizing circuits for said electric motor and each of said valves, and separate switch means for each fluid motor valve for selectively energizing one of said fluid motor valves and concomitantly energizing said electric motor.

JOHN B. PARSONS.